United States Patent
van Vugt

(10) Patent No.: US 6,833,835 B1
(45) Date of Patent: Dec. 21, 2004

(54) METHOD AND APPARATUS FOR ANTIALIASED IMAGING OF GRAPHICAL OBJECTS

(75) Inventor: Henricus Antonius Gerardus van Vugt, Dutch (NL)

(73) Assignee: Siemens AG, Frankfurt (DE)

( * ) Notice: Subject to any disclaimer, the term of this patent is extended or adjusted under 35 U.S.C. 154(b) by 0 days.

(21) Appl. No.: 09/576,584

(22) Filed: May 22, 2000

(30) Foreign Application Priority Data

May 20, 1999 (EP) .......................................... 99201598

(51) Int. Cl.$^7$ .......................... G06F 12/00; G06F 12/02; G06F 12/06; G06T 5/00; G06T 7/00
(52) U.S. Cl. ....................... 345/566; 345/629; 345/553; 345/568; 345/611; 345/566; 345/419
(58) Field of Search ................................ 345/639, 611, 345/589, 419, 619, 615, 565, 629, 553, 566, 568

(56) References Cited

U.S. PATENT DOCUMENTS

| | | | | |
|---|---|---|---|---|
| 5,278,678 A | | 1/1994 | Harrington | ................. 358/518 |
| 5,299,308 A | * | 3/1994 | Suzuki et al. | ................ 345/501 |
| 5,502,795 A | * | 3/1996 | Shirouzu | ..................... 358/1.9 |
| 5,684,939 A | | 11/1997 | Foran et al. | ................ 395/131 |
| 6,133,901 A | * | 10/2000 | Law | ........................... 345/611 |

\* cited by examiner

Primary Examiner—Jeffery Brier
Assistant Examiner—Javid Amini
(74) Attorney, Agent, or Firm—Mayer, Brown, Rowe & Maw LLP

(57) ABSTRACT

A method for antialiased imaging of graphical objects on a pixel oriented display by rasterizing input pixel data as virtual pixels into a memory with a virtual resolution that is a factor higher than the physically displayed pixel resolution. In accordance with the invention, the existing color value of the physical pixel that corresponds to a virtual pixel to be modified is retrieved from the memory, the input color value of said virtual pixel to be rasterized is derived from the pixel input data, and split in its basic red, green and blue color components. The existing and the input color value are linearly combined for each color component in accordance with: $((N-1)*\text{existing color value}+M*\text{input color value})/N$, in which M represents a value at least equal to one and N being $R^2$, and the result thereof used to overwrite the existing color value of the physical pixel at the memory location of said physical pixel.

6 Claims, 4 Drawing Sheets

METHOD AND APPARATUS FOR ANTIALIASED IMAGING OF GRAPHICAL OBJECTS

BACKGROUND OF THE INVENTION

1. Field of the Invention

The present invention relates generally to the field of imaging systems. More specifically, the present invention relates to a system and method for antialiased imaging of graphical objects on a pixel-oriented display by rasterizing input pixel data as virtual pixels into a memory with a virtual resolution that is higher than the physically displayed pixel resolution.

2. Description of the Related Art

The general approach in antialiasing is known as super sampling and is described in e.g. 'Computer Graphics—Principles and Practice' second edition by James D. Foley et al, published by Addison-Wesley Publishing Company, Reading Massachusetts 15 US, 1990, ISBN 0-201-12110-7, section 14.10.6.

Antialiasing is used to enhance image quality by reducing certain visible effects, known as 'staircasing'. Staircasing is the result of projecting (drawing) objects onto the physical pixels of the display occurring at the boundaries of those projections. A pixel is either replaced with the colour of the object, or it is left unchanged. Antialiasing methods can be 'online' or 'offline'. In offline antialiasing several (pre-antialiased) fixed images are stored, which can be reproduced upon request. Although the image quality can be made almost perfect (depending on the tooling that is used), a great disadvantage is that it requires a lot of memory for storage. An additional disadvantage is that there is no flexibility, when it comes to picturing mutually (multiple) overlapping objects (all overlap combinations would have to be prepared up front). Offline antialiasing is applicable only in very specific areas, such as e.g. in displaying pointers of clocks, speedometers, etc and is not suitable for displaying more dynamically varying objects, such as those which occur in the display maps for navigation systems, or in computer related applications, such as e.g. computer games.

The above referenced super sampling approach is usually implemented as an online method, i.e. image antialiasing is being performed online, for example during the process of reading out the image data and sending it to the display. The image is being rasterized (i.e. stored in an image data memory) in subpixels smaller than the display pixels, therewith achieving a higher resolution than the display resolution, hereinafter indicated as normal resolution. This rasterized image is then converted to the normal resolution by combining or averaging the colour values of the subpixels included in the corresponding display pixel, where after the resulting colour is sent to the display. This so-called 'super sampling' method of antialiasing is very demanding with respect to memory capacity (twice the resolution also means four times the amount of memory).

SUMMARY OF THE INVENTION

One object of the present invention is to provide a system and method for executing the method for image antialiasing based on super sampling, which compared with the above-known super sampling method uses much less memory capacity and achieves better performance in particular with regard to the flexibility and accuracy of antialiasing.

A method for antialiased imaging of graphical objects on a pixel oriented display by rasterizing input pixel data as virtual pixels into a memory with a virtual resolution that is higher than the physically displayed pixel resolution according to the invention is therefore characterized by several steps. The steps comprise retrieving from the memory an existing colour value of the physical pixel that corresponds to a virtual pixel to be modified, and retrieving from the pixel input data to be rasterized the input colour value of said virtual pixel, by splitting the so retrieved existing and input colour values in basic red, green and blue colour components. Thereafter, the system linearly combines per each colour component the existing and the input colour value and by using the result thereof to overwrite the existing colour value of the physical pixel at the memory location of said physical pixel.

By applying the measures according to the invention, the use of memory capacity is reduced to a minimum in that the virtual pixel input data are being linearly combined with the existing colour value of a physical pixel in an online process before using the result of this linear combination to overwrite the existing colour value of the relevant physical pixel at its original memory location. In this process there is no need for additional memory capacity to store the virtual pixels at double resolution separated from the original colour values of the physical pixels.

Preferably a method according to the invention is characterized in that in linearly combining per each component the existing and the input colour value weighting factors are used, depending on the factor (R) by which the virtual pixel resolution is higher than the physical pixel resolution according to the following algorithm:

$((N-1)*\text{existing colour value}+M*\text{input colour value})/N$, in which M represents a value of at least one and N being $R^2$.

This measure noticeably improves the flexibility and accuracy of the colour definition, needed to minimize the above mentioned visible 'staircasing' effect, resulting from projecting (drawing) objects onto the physical pixels of the display occurring at the boundaries of those projections.

A further preferred method according to the invention is characterized by a repetition of the above algorithm, the number of repetition cycles being determined by the number of virtual pixels being effected with a change in colour value.

This measure further improves the accuracy of the colour definition. In order to make sure that the above algorithm when being applied to all virtual pixels within a certain physical pixel result in a colour substantially identical to the 'colour obtained when changing said certain physical pixel directly, M is determined to arrive substantially at the input colour value after completion of the Nth cycle of the algorithm.

This measure results in M being a non-integer number greater than one. When being applied e.g. to a virtual pixel resolution twice the physical resolution, N and M in the above algorithm are to be given the values 4 and 1.463, respectively. However, for execution of the above algorithm in digital form, M is preferably rounded off to a number representing an addition of a number of binary values of $2^2 i$ in which i is an integer varying between zero and a negative value, depending on the accuracy of M.

Applying this measure to a virtual pixel resolution twice the physical resolution, N and M in the above algorithm are preferably chosen to be 4 and 1.5, respectively.

Applying this measure to a virtual pixel resolution four times the physical resolution, N and M in the above algorithm are preferably chosen to be 16 and 1.5, respectively.

These values significantly simplify digital implementation of the algorithm. The above and other object features and advantages of the present invention will be discussed more in detail hereinafter with reference to the disclosure of preferred embodiments and in particular with reference to the appended figures.

DETAILED DESCRIPTION OF THE PREFERRED EMBODIMENTS

Figure 1:
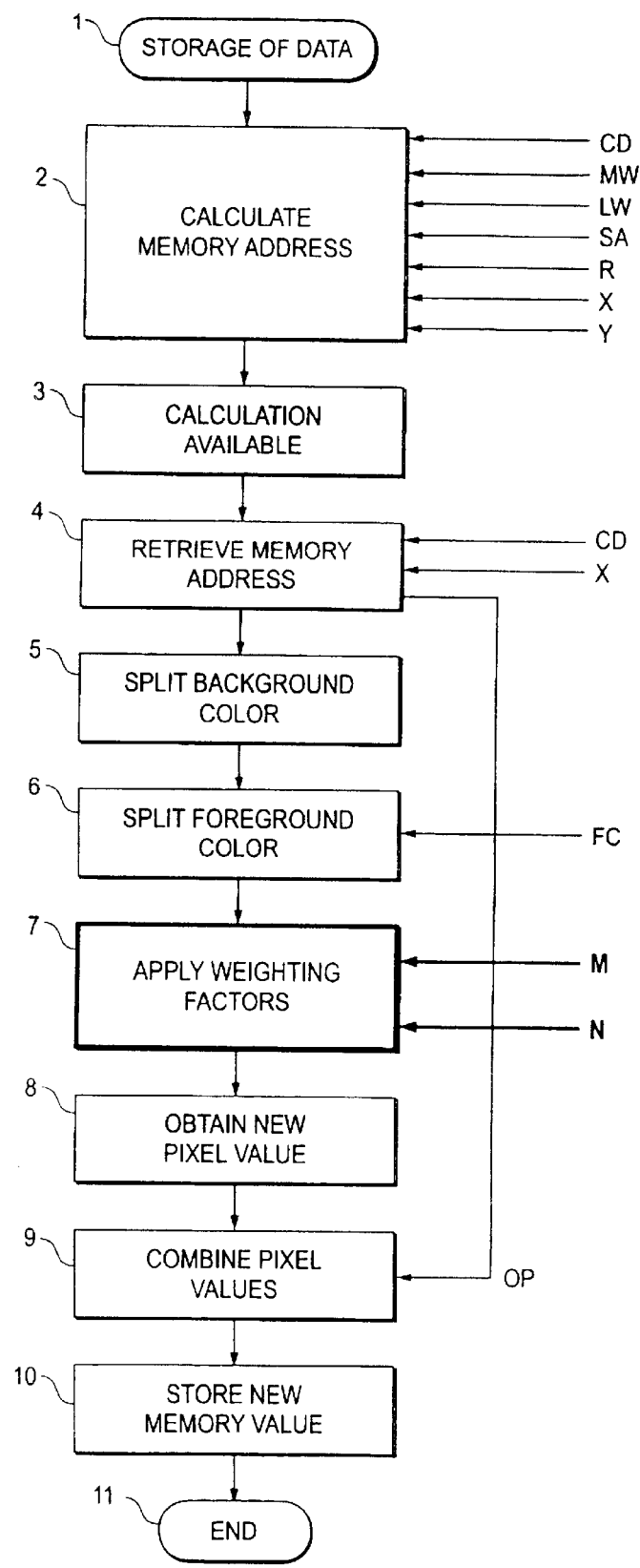
FIG. 1: is a flowchart which illustrates a method for antialiased imaging of graphical objects according to the invention.

FIG. 1 is a flowchart of a software programme for the execution of a method for antialiased imaging of graphical objects on a pixel oriented display according to the invention, starting in block 1 with initiating the storage of data of a virtual pixel (hereinafter referred to as reference pixel) into a memory. In block 2, the memory address within a given frame-buffer of the physical pixel corresponding to the reference pixel is calculated. The calculation method as such is known and doesn't need to be further explained to understand the invention. Parameters in the calculation are a.o. the colour depth (e.g. in 2, 4, 3 or 16 bits per pixel) referred to as CD, the memory width (e.g. 16 or 32 bits) referred to as MW, the line width (i.e., the number of pixels per line) referred to as LW, the frame-buffer start address referred to as SA, the factor by which the virtual resolution is greater than the normal resolution (e.g. 1, 2 or 4) referred to as R and the virtual X-coordinate and the virtual Y-coordinate. In block 3, the result of the calculation in block 2 becomes available and is used in block 4 to retrieve at the calculated memory address the (existing or background colour) value of the physical pixel, using the colour depth (CD) and the virtual X-coordinate (X).

In block 5 the background colour is split in its basic red-, green- and blue-component and the same colour split is provided in block 6, however now with regard to a so called input or foreground colour, referred to as FC, i.e. the colour of the object being projected on the existing colour. These data are being used in block 7 to linearly combine per each component the existing and the input colour value wherein weighting factors are used, depending on the factor (R) by which the virtual pixel resolution is higher than the physical pixel resolution according to the following algorithm:

((N−1)*existing colour value+M*input colour value)/N, in which M represents a value at least equal to one and N being R2.

In block 8 a new value of the physical pixel is obtained by combining the new basic component colour values forming the changed background colour. In block 9 this new value is further combined with the value of other virtual pixels, referred to as OP, at the same storage location as the physical pixel to arrive at the new memory colour value. In block 10 this new memory value is stored at the previously calculated memory address, whereafter the programme stops this so called pixel 'putting' process in block 11.

Figure 2:
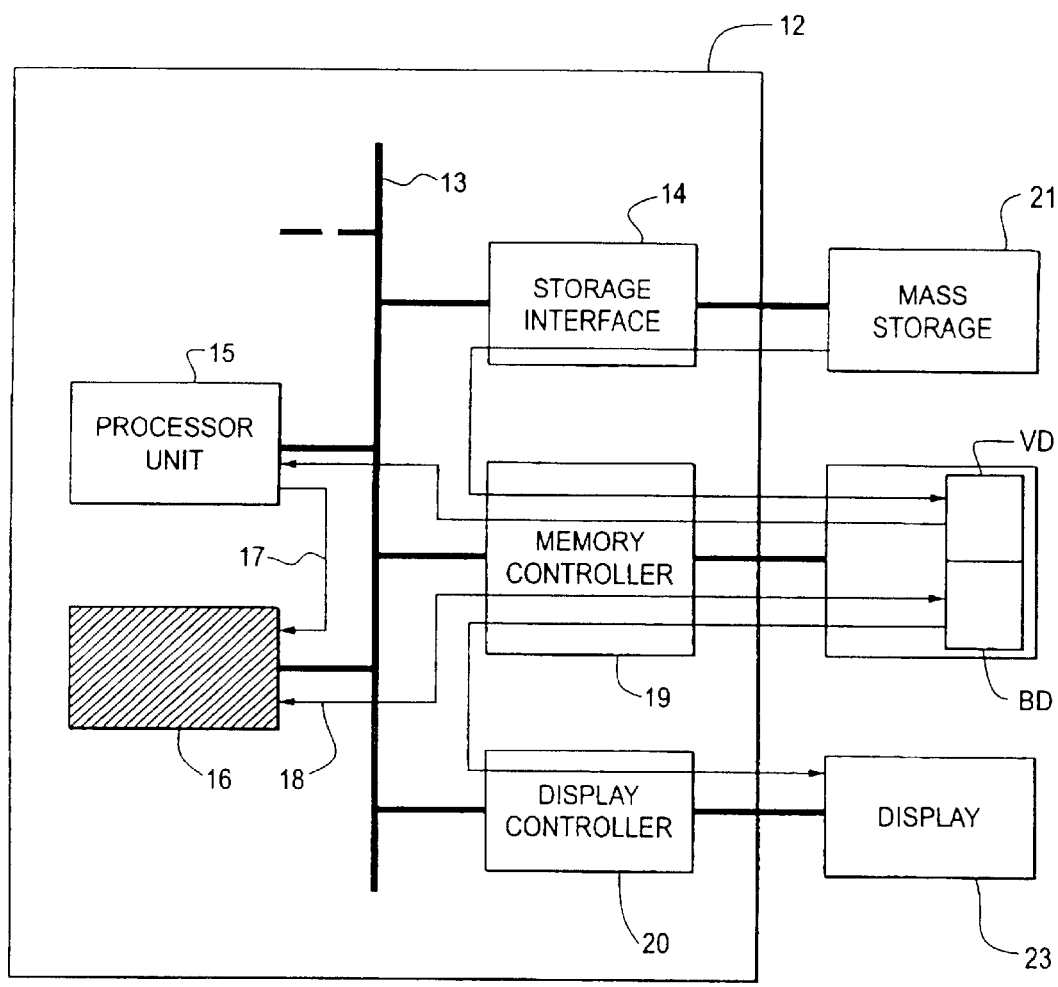
FIG. 2: is a block diagram of a device for executing the method of FIG. 1.

FIG. 2 is a block diagram of a device executing the method presented by the flowchart of FIG. 1, in which an integrated circuit 12 cooperates with a mass-storage reading device 21 (such as a CD ROM reader), a memory 22 and a pixel oriented display 23. The integrated circuit 12 comprises a system bus 13 providing a data communication channel mutually connecting a mass-storage interface 14 (such as e.g. a CD ROM interface unit) coupled to said mass-storage reading device 21, a processor unit 15, a pixel modification unit 16, also referred to as 'put pixel' module, a memory controller 19 coupled to said memory 22, and a display controller 20 coupled to said display 23. Pixel data, derived e.g. from vector data, relating to graphical objects that are to be drawn (such as lines, circles, polygons, etc.) is read from a mass-storage device (such as a CD ROM—not shown) by the mass-storage reading device 21 and transferred via the mass-storage interface 14 and the system bus 13 to the memory controller 19 for storage thereof in a vector data (VD) part of the memory 22. Bitmap data is stored in a bitmap data (BD) part of the memory 22.

The processor unit 15 reads the vector data from the memory 22 via the memory controller 19 and processes it. Processing (rasterizing) the graphical objects that are to be drawn will eventually result in the need for changing the colour of effected pixels, which have been stored in the memory 22, the new colour being the colour of the graphical object that is being currently read out by the processor 15. Instead of directly modifying the colour values of pixels in the memory 22, the processor unit 15 sends requests for modification of these pixels to the 'put pixel' module 16, providing the above pixel 'putting' process. The 'put pixel' module 16 is capable of storing several requests and handling the requests by itself, without further intervention by the processor unit 15.

The 'put pixel' module 16 modifies the colour of the pixels in memory for which it received a request for modification from the processor unit 15. For this the 'put pixel' module 16 cooperates with the memory controller 19 to read out the pixel data involved in the modification from the memory 22 and to write these pixel data back therein after modification. Without the antialiasing method according to the invention, the 'put pixel' module 16 would only receive and handle requests on so-called 'physical pixels', pixels that will eventually be visible on the display and have been stored as such somewhere in the memory 22. In contrast therewith, the 'put pixel' module 16 in performing the antialiasing method according to the invention, receives and handles so-called 'virtual pixels' (higher resolution), pixels that are actually not present in memory. For each incoming virtual pixel the 'put pixel' module 16 modifies the colour value of the corresponding physical pixel and subsequently has the result of this modification stored, which on itself removes the need for large memory capacity. Furthermore such pixel-wise processing allows for an effective and flexible implementation of the above-indicated algorithm.

In accordance with the invention the antialiasing algorithm is applied to virtual pixels at a higher resolution (for example double resolution) than the display resolution without actually putting the pixels into memory. Putting pixels into memory at such high resolution would require more memory (in the example: four times the normal storage capacity). Instead the virtual pixel values are passed on to the 'put pixel' module 16 which may be implemented in hardware or in software using these values to update the normal-resolution display image in accordance with the above mentioned algorithm before storing the same.

When a double-resolution virtual pixel is transferred to, the put pixel module 16, the address of the memory location containing the corresponding normal-resolution physical pixel is being calculated therein. The 'background colour' present at this memory address is read out and split into its basic red, green and blue (R-, G- and B-) colour components. This colour split is also applied to the colour of the incoming double-resolution virtual pixel ('foreground colour'). For each colour component 3 times the background colour, also referred to as 'old' colour value, is taken plus 1 time the foreground colour, also referred to as 'new' colour value. The result is divided by 4. Doing so for each colour component gives a new colour, which is then written back to the memory location wherefrom the background colour was originally read.

The algorithm may well be applied to virtual pixels at a resolution higher than double resolution, resulting in even higher image quality. At e.g. quadruple resolution 16 times the original amount of pixels have to be processed (or 'put') in the put pixel module 16. In order to prevent the processing from becoming laborious at quadruple or higher resolution, the use of the algorithm may be restricted to critical pixels, i.e. used only where absolutely needed (for example for characters only). In general the quality of antialiasing can be adapted to the content of the picture while composing the complete image. For example no antialiasing for the bodies of filled objects that have to be drawn (antialiasing factor' of 1), double-resolution antialiasing at the borders of these objects (antialiasing factor' of 2) and e.g. quadruple-resolution antialiasing for text (antialiasing factor' of 4).

As pointed out before, for double-resolution antialiasing the algorithm that was described provides a colour modification based on: (3*old colour value+1*new colour value)/4. For quadruple-antialiasing the algorithm would provide a colour modification based on: (15*old colour value+1*new colour value)/16, etc.

In practice, it may be worthwhile to further improve the algorithm on the following effect. Suppose the background colour is black (let's call this 0%) and the foreground colour is white (let's call this 100%). In applying the algorithm for four double-resolution pixels that belong together, e.g. somewhere in the middle of an object to be drawn, the algorithm (3*old colour value+1*new colour value)/4 will be invoked four times. This will lead to a result of approximately 68%, i.e. less than 100%, which may become visible as a loss of contrast and/or as strange colour effects. If for example a yellow line is drawn on top of a solid yellow box, with all drawing done on virtual pixels, then the line will be visible 'within' the-box (the yellow will be brighter there, up to a value of 100%).

To prevent these colour effects from occurring, the algorithm is corrected to read (3*old colour value+1.463*new colour value)/4, therewith giving more weight to the new colour value. Experiments show that (3*old colour value+1.5*new colour value)/4, which is much easier to implement in both hardware and software, gives very good results. Instead of 100% the result is 102.54%. This can be hard limited or clipped to 100%. For quadruple resolution a factor of 1.5 for the new colour value would lead to approx. 96.59%, which is sufficiently close to 100% to allow the algorithm to be used in antialiasing pixels at borders of graphical objects. The colour differences caused by the difference between 96.59% and 100% are in practice hardly visible.

In general the antialiasing algorithm' is to be applied to the basic red-, green- and blue-colour components of each pixel to be processed. This means, that the algorithm deals with 3 (static) input parameters:

Red=(N−1)*background_red+M*foreground-red)/N;

green=((N−1)*background_green+M*foreground_green)/N;

blue=((N−1)*background_blue+M*foreground_blue)/N;

if (red>maximum_red) then (red=maximum_red);

if (green>maximum_green) then (green=maximum_green);

if (blue>maximum_blue) then (blue=maximum_blue);

background_red=red;

background_green=green;

background_blue=blue;

Due to its simplicity, this algorithm is easy to implement. If it is implemented in hardware (which is far most performance effective), then it is important that the multiplications and divisions can be realized by means of shift operations, additions and subtractions. For example multiplying a digital number by 3 can be realized by shifting the number to the left by 2 bits (thus multiplying it by 4) and then subtracting therefrom the original number. If implemented in hardware, the algorithm can be described in more general form as follows:

red=((background_red<<A−background_red)+(foreground_red+foreground_red>>$B_1$+ . . . +foreground_red>>$B_k$))>>A;

green=((background_green<<A−background_green)+(foreground_green+foreground_green>>$B_1$+ . . . +foreground_green>>$B_k$))>>A;

blue=((background_blue<<A−background-blue)+(foreground_blue+foreground_blue>>$B_1$+ . . . +foreground_blue>>$B_k$))>>A;

background_red=red;

background_green=green;

background_blue=blue,

In the previous example '>>A', respectively '>>B', means shifting to the right by A, respectively 2, bits and adding zeroes at the left side. '<<A', respectively '<<B', means shifting to the left by A, respectively B, bits and adding zeroes to the right.

In above expressions:

$$A = \mathrm{sqr}(N) = R$$

$$M = 1 + (1/2^{B_1}) + (1/2^{B_2}) + \ldots + (1/2^{B_k})$$

For double-resolution antialiasing parameter A will have the value 2, for quadruple-resolution antialiasing it will have the value 4. So A is in fact the 'antialiasing factor'.

Things also work when A has the value 3 for example. In this case the resolution will be sqr(8) times more than without antialiasing. This number (so the square root of 8) seems difficult to be handled by software, but it only means that the (virtual) number of pixels in both X- and Y-direction is sqr(8) times more than without antialiasing. So the (virtual) bitmap is only a certain amount bigger, in this case for example 905×679 pixels instead of 320×240.

Parameters $B_1$ through $B_k$ are needed to compensate for the loss of contrast (see earlier description). The number of parameters for a certain implementation depends on the required accuracy. If for example (3*old colour value+1.5*new colour value)/4 is sufficient, then only one B parameter is needed. In that case it is possible to use the values 2, 1.5, 1.25, 1.125, and so on (until it makes no more sense from implementation point-of-view or image-quality point-of-view). If an implementation has two B parameters, then it is also possible to have values like 3, 2.5, 2.25, 2.125, 1.75, 1.625, etc. So going from one to two B parameters results in much higher accuracy regarding the compensation of contrast loss.

In an RGB555 environment (each colour component having 5 bits, so values varying between 0 and 31) there is no need for the B parameters to have more than 4 bits themselves, because for example shifting a 5-bit colour value right more than 4 times always gives the result 0 (and thus adds nothing to the algorithm).

4 bits for the parameter A is also more than sufficient in an RGB555 environment. One 4-bit A parameter and two 4-bit B parameters is a kind of optimum for this colour depth.

The 'put pixel' module 16 is functioning as a fully independent module on the central system-bus 13. It takes care of putting or storing pixels into the memory 22, so not only antialiased pixels, but pixels in general. Putting also non-antialiased pixels into the memory 22 via such a module 16 offloads the software processing, because without hardware support all processing steps for each pixel have to be performed by software. The memory address of the pixel has to be calculated (based on the line-width and the X- and Y-coordinates), the memory location must be read, the read value (which usually contains more than one pixel) must be updated with the new colour (at the correct location), and finally the results has to be written back to memory.

The 'put pixel' module 16 will have a certain number of static input parameters, so parameters that in a typical application may only need to be changed once in a while. In other applications, these parameters may well change for each pixel, being:

The colour-depth (number of bits per pixel; for example 2, 4, 8 or 16)

The line-width (number of pixels per line; for example between 0 and 1 0 2 3 )

The antialiasing parameters (see previous description; for example A, B1 and B2, each 4 bits wide)

The frame-buffer start address (the memory address of the pixel in the upper left corner of the image)

Besides these static parameters there are a number of dynamic parameters, so parameters that typically change frequently:

The X-coordinate (in this case between 0 and 1023, like the line-width setting)

The Y-coordinate (for example also between 0 and 1023)

The required colour (in this case 2, 4, 8 or 16 bits, so according to the colour-depth setting).

One of these 3 parameters should be chosen as the 'trigger' for the 'put pixel' module 16 to start the pixel processing operation. For example the actual writing of the Y-coordinate could serve as a signal that the settings for a new pixel are complete. This means that the required colour only has to be programmed once in case a lot of pixels with the same colour have to be 'put' (which is typically the case). If needed an additional parameter can be added to the module, indicating which parameter serves as trigger. The 'put pixel' module 16 will have some kind of 'pixel queue' inside. This FIFO (First-In-First-Out memory) stores (buffers?) pending pixel requests, thus allowing the central processor 15 in the system to resume its tasks and not having to wait until pixel operations in the put pixel module 16 are finished.

The 'put pixel' module 16 functions as slave on the system-bus 13 (for receiving the mentioned settings), as well as master (for being able to do the requested memory operations by itself).

From a hardware point-of-view it is very easy to extend the described functionality with the support for drawing horizontal- and vertical lines (1 pixel wide, 1 colour) and for filling rectangular shaped objects (1 colour). This requires two additional (dynamic) parameters, which might also serve as trigger:

An X-count value (in this case between 0 and 1023, like the line-width setting)

An Y-count value (for example also between 0 and 1023)

When all pixels in a picture frame have been processed by the 'put pixel' module 16 in accordance with the above method according to the invention, the frame will be read from the memory 22 by the display controller 20 via the memory controller 19 and send to the display 23. In a typical application, there will be two frame-buffers (some applications have more), where one frame-buffer is being used by the processor 15 and the 'put pixel' module 16 for providing a new frame, while the contents of the other frame-buffer is being transferred to the display 23 by the display controller 20 via the memory controller 19. In such typical application, the two frame-buffers mutually change alternately in function.

Figure 3A:
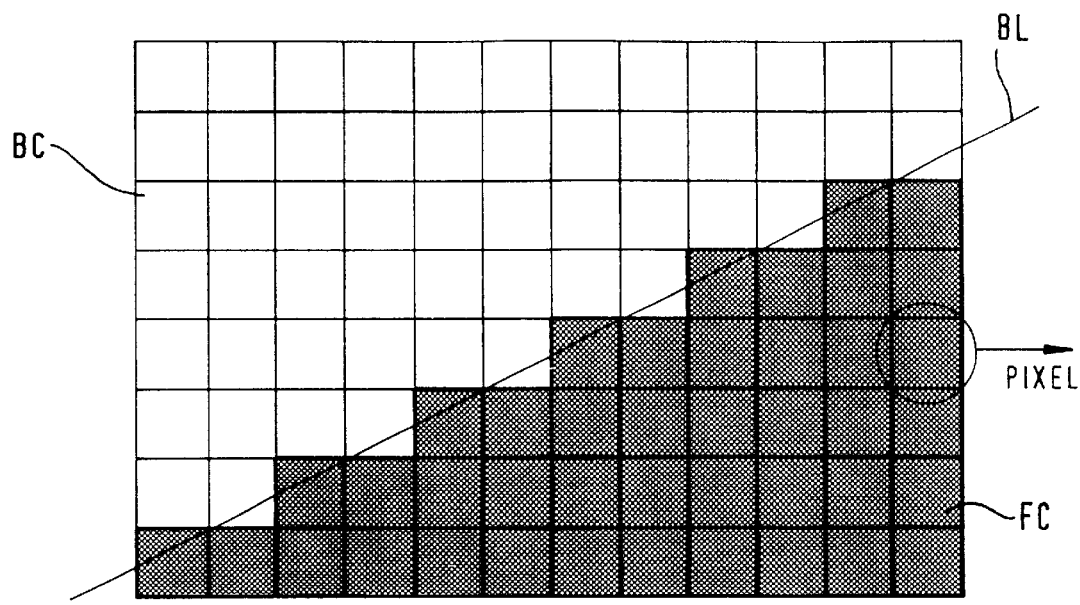
FIGS. 3a–c illustrates pictures of a borderline of a graphical object against a background color on a pixel-oriented display, respectively without using the antialiased imaging method according to the invention, in a virtual resolution twice the physically displayed pixel resolution (hereinafter referred to as normal resolution) and when using the antialiased imaging method according to the invention.

FIG. 3a shows the physical pixels on a pixel-oriented display in case antialiasing is not applied.

Figure 3B:
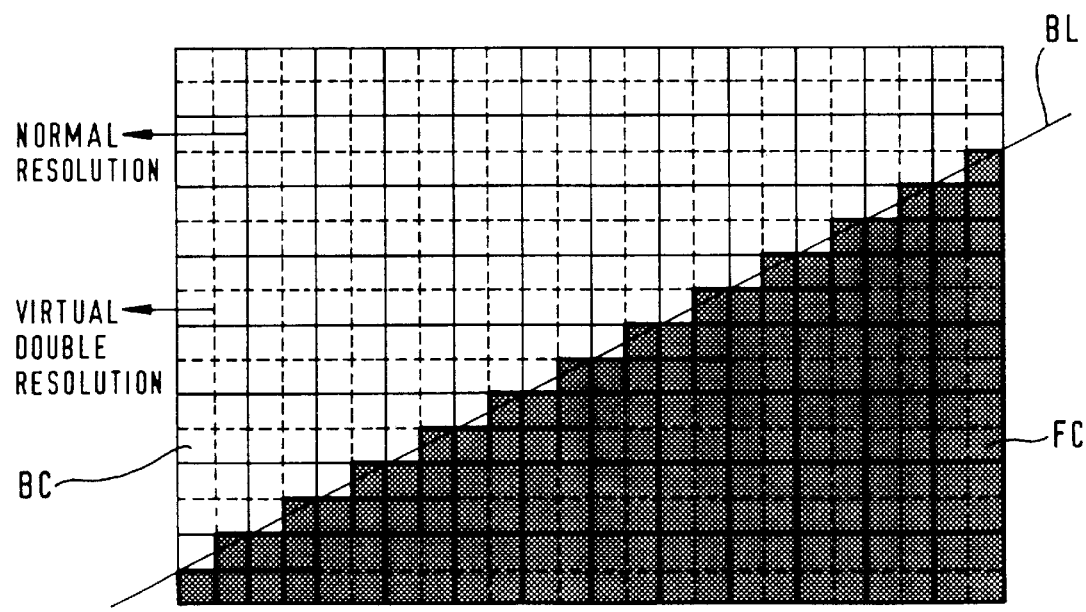

FIG. 3b shows an example of the colour effects on virtual pixels in case of double resolution antialiasing. Antialiasing is required only for pixels at the border between background and foreground colours. Other pixels do not require to be antialiased. The virtually double resolution grid is presented with dotted lines in between the bold lines, indicating the normal or physical resolution.

Figure 3C:
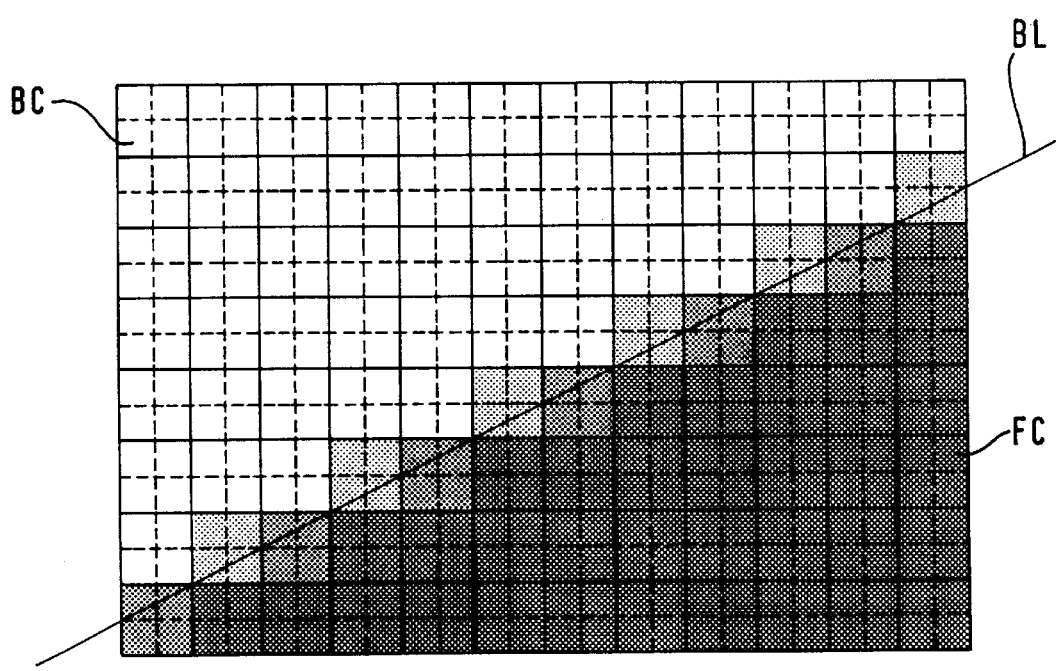

FIG. 3c shows the result of the method of antialiasing according to the invention used in connection with the example shown in FIG. 3b.

What is claimed is:

1. A method for antialiased imaging of graphical objects on a pixel oriented display having a display memory storing physical pixels located on the display, comprising:

retrieving from the display memory an existing colour value of a physical pixel located on the display to be modified;

retrieving different virtual pixels having input colour values from a separate memory, the virtual pixels associated solely with the physical pixel and not stored in the display memory and not physically displayed on the display;

retrieving from pixel input data to be rasterized an input colour value of said virtual pixel by splitting the retrieved existing and input colour values in basic red, green and blue colour components, by linearly combining for each colour component the existing and the input colour value;

using the results of the combination derived from various different virtual pixels corresponding to the location of the physical pixel to overwrite the existing colour value of the physical pixel at the memory location of said physical pixel; and while linearly combining for each component the existing and the input colour value, applying weighting factors, depending on a factor by which the virtual pixel resolution is higher than the physical pixel resolution according to the following algorithm: ((N−1)*existing colour value+M*input colour value)/N, in which M represents a value at least equal to one and N being $R^2$.

2. A method according to claim 1, further comprising such that repeating the algorithm, such that a number of repetition cycles is determined by a number of virtual pixels being effected with a change in colour value.

3. A method according to claim 1, wherein M is determined to arrive substantially at the input colour value after completion of the Nth cycle of an algorithm.

4. A method according to claim 1, wherein M is implemented as an addition of a number of binary values of $2_i$, in which i is an integer varying between zero and a negative value, the number of additions depending on the required accuracy of M.

5. A method for antialiased imaging of graphical objects on a pixel oriented display comprising:

retrieving from the memory an existing colour value of a physical pixel located on the display to be modified that corresponds to a virtual pixel associated solely with the location of the physical pixel;

retrieving from pixel input data to be rasterized an input colour value of said virtual pixel by splitting the retrieved existing and input colour values in basic red, green and blue colour components, by linearly combining for each colour component the existing and the input colour value;

using the results of the combination deriving from various different virtual pixels corresponding to the location of the physical pixel to overwrite the existing colour value of the physical pixel at the memory location of said physical pixel;

linearly combining for each component the existing and the input colour value, applying weighting factors, depending on a factor by which the virtual pixel resolution is higher than the physical pixel resolution according to the following algorithm:

((N−1)*existing colour value+M*input colour value)/N, in which M represents a value at least equal to one and N being $R^2$, wherein N=4 and M=1.5.

6. A method for antialiased imaging of graphical objects on a pixel oriented display comprising:

retrieving from the memory an existing colour value of a physical pixel located on the display to be modified that corresponds to a virtual pixel associated solely with the location of the physical pixel;

retrieving from pixel input data to be rasterized an input colour value of said virtual pixel by splitting the retrieved existing and input colour values in basic red, green and blue colour components, by linearly combining for each colour component the existing and the input colour value;

using the results of the combination deriving from various different virtual pixels corresponding to the location of the physical pixel to overwrite the existing colour value of the physical pixel at the memory location of said physical pixel;

linearly combining for each component the existing and the input colour value, applying weighting factors, depending on a factor by which the virtual pixel resolution is higher than the physical pixel resolution according to the following algorithm:

((N−1)*existing colour value+M*input colour value)/N, in which M represents a value at least equal to one and N being $R^2$, wherein N=16 and M=1.5.

* * * * *